(12) United States Patent
Yip et al.

(10) Patent No.: US 6,980,550 B1
(45) Date of Patent: Dec. 27, 2005

(54) METHOD AND APPARATUS FOR SERVER LOAD BALANCING

(75) Inventors: Michael Yip, Sunnyvale, CA (US); Desikan Saravanan, Santa Clara, CA (US); Arthur Lin, Sunnyvale, CA (US); Edward Joel Rovner, Chapel Hill, NC (US); Tash Hepting, San Jose, CA (US); Paul Anderson, San Jose, CA (US); Brian Bailey, Monte Sereno, CA (US)

(73) Assignee: Extreme Networks, Inc, Santa Clara, CA (US)

( * ) Notice: Subject to any disclaimer, the term of this patent is extended or adjusted under 35 U.S.C. 154(b) by 772 days.

(21) Appl. No.: 09/761,281

(22) Filed: Jan. 16, 2001

(51) Int. Cl.[7] .......................... H04L 12/28; H04L 12/56
(52) U.S. Cl. .................. 370/392; 370/395.32; 370/401
(58) Field of Search ........................... 370/392, 395.32, 370/401, 400, 395.52, 409, 428, 395.5, 465, 370/295.32

(56) References Cited

U.S. PATENT DOCUMENTS

| | | | |
|---|---|---|---|
| 5,371,852 A | | 12/1994 | Attanasio et al. |
| 5,949,786 A | * | 9/1999 | Bellenger .................. 370/401 |
| 6,212,565 B1 | * | 4/2001 | Gupta ........................ 709/229 |
| 6,470,389 B1 | * | 10/2002 | Chung et al. ................ 709/227 |
| 6,665,297 B1 | * | 12/2003 | Hariguchi et al. ........... 370/392 |
| 6,735,206 B1 | * | 5/2004 | Oki et al. ............... 370/395.32 |

OTHER PUBLICATIONS

"Web Server Load Balancing and Redundancy", *Microsoft TechNet*, www.microsoft.com/technet/ecommerce/duwws-r.asp, pp. 1-16, Aug. 24, 2000.
"White Paper Summary: Server Load Balancing (SLB): A Strategic Necessity", *Resonate*, www.nwfusion.com/whitepapers/resonate/resonate_wp.html, Aug. 24, 2000.
"Growing Your E-Business with IBM Server Load Balancing and Caching embedded solutions", *IBM*, www.networking.ibm.com/white/serverload, pp. 1-9, Jul. 24, 2001.

* cited by examiner

*Primary Examiner*—Afsar Qureshi
(74) *Attorney, Agent, or Firm*—Blakely Sokoloff Taylor & Zafman, LLP

(57) ABSTRACT

A method for forwarding data packets to one of a plurality of servers comprising receiving a data packet from a source, at a data packet forwarding device having a plurality of ports, performing a hashing function using a unique component of the data packet as a seed value for the hash, generating a hash value using the hashing function, looking up a table for an address of one of the plurality of servers using the hashed value as an index to the table, and forwarding the data packet to a server corresponding to the address.

14 Claims, 4 Drawing Sheets

SLB Address Table

| IP Addr. Server | IP Addr. Client | Virtual IP Addr. Dest. | TCP Src. Port # | TCP Dest. Port # |
|---|---|---|---|---|
| 192.10.1.1 | 11.4.8.2 | 196.12.1.1 | 20 | 8 |
| 192.10.1.2 | 12.8.9.5 | 196.12.1.1 | 5 | 6 |
| 192.10.1.3 | 11.5.7.3 | 196.12.1.1 | 3 | 2 |

FIG. 2 (PRIOR ART)

Server Load Sharing Table 300

| Server [i] | IP Addr. of Server in Server Bank |
|---|---|
| 0 | 192.10.1.1 |
| 1 | 192.10.1.2 |
| 2 | 192.10.1.3 |

FIG. 3

METHOD AND APPARATUS FOR SERVER LOAD BALANCING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to a method and apparatus for controlling traffic in an internetwork. In particular, the present invention is related to a method and apparatus for server load balancing based on a hashing function.

2. Description of the Related Art

The growth of the Internet has caused problems unanticipated in its original design. As new users (clients) connect to the Internet. For example, to access servers for e-commerce, financial transactions, and intranet applications, the load on the servers has greatly increased. As the number of clients that access a server increase, the number of data packets processed by the server also increases. This increased load on the server may result in communications between clients and the server slowing down or timing out.

To solve this problem, the processing capability of the server may be increased, or a server with increased processing capacity may replace the old server. Ultimately, as shown in FIG. 1, additional servers 106–108, may be added to form a cluster of servers or server bank 110 to respond to the needs of clients. The server bank 110 provides a plurality of servers, each with the same content. Users, therefore, may connect to any one of the servers to access desired information. As can be seen, however, it is desirable to balance the demand, or load, placed on any one server, so that the resources of the server bank are effectively utilized. To that end, a Server Load Balancing (SLB) algorithm may be employed at router 105 wherein sessions from any one of clients 101-n are connected to a particular server in the server bank. The term clients, as used herein is construed to mean personal computers, wireless devices etc. that may be used to communicate with a server. As examples, a round robin algorithm, or a least connections algorithm is employed by a SLB algorithm to direct communications to one of a plurality of servers in the server bank.

With reference to FIG. 2, a SLB address table 200 may be maintained in router 105 to facilitate connections between clients and a server in the server bank. The SLB address table maintains information, in particular, address information for each server in the server bank, and each client that accesses the server bank, and maintains a mapping or binding between a particular client and server. This facilitates maintaining "sticky connections" between the server and client. A sticky connection is a connection wherein the same client communicates with the same server across multiple connection requests. For example, during multiple Transmission Control Protocol (TCP) (see RFC 793 and 879 for details on TCP) connection requests, a user accesses multiple related web pages during the filling out of a multi-page form using HyperText Transfer Protocol (HTTP) (see RFC 1945 for details on HTTP). The SLB address table contains an entry for each TCP connection comprising the Internet Protocol (IP) address of the client (source), and the server (destination), and the TCP port numbers of the client and server. When a data packet arrives at router 105 from a client, the router looks up in the SLB address table for an entry for a connection between the client and a server in the server bank. If there is a connection, the data packet is forwarded to the server in the server bank identified by the server IP address specified in the entry. However, if an entry does not exist in the SLB address table, a server is mapped to the client based on, for example, a round robin or least connections algorithm, and an entry corresponding to the connection is made in the SLB address table.

Subsequent data packets from a particular client connection are routed to the allocated server in the server bank by the router after performing a look up in the SLB address table as disclosed above. With numerous data packets from different clients, the router looks up the appropriate server's IP address in the SLB address table for each data packet received. With a large number of client connections, the size of the SLB address table can become very large, and a considerable amount of processing overhead is incurred by the router in searching the table for the address of the server prior to forwarding each data packet. As shown in FIG. 2, for 'n' clients, the router may have to search through at least 'n' rows of data for a server's IP address. This process is time consuming, inefficient and may require considerable memory to store the SLB address table. What is needed, therefore, is a more efficient way to balance traffic load among a plurality of servers.

BRIEF SUMMARY OF THE INVENTION

The invention discloses receiving a data packet at a router, generating a hashed value based at least in part on the source and the destination address specified in the data packet, selecting a server in a server bank based on the hashed value, and forwarding the data packet to the selected server.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

FIG. 2 illustrates an example of an SLB address table that is used in the prior art.

FIG. 3 illustrates an example of a server address table in accordance with an embodiment of the invention.

DETAILED DESCRIPTION OF THE INVENTION

A method and apparatus is described for server load balancing. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention. For example, specific details are not provided as to whether the method is implemented as a software routine, hardware circuit, firmware, or a combination thereof.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
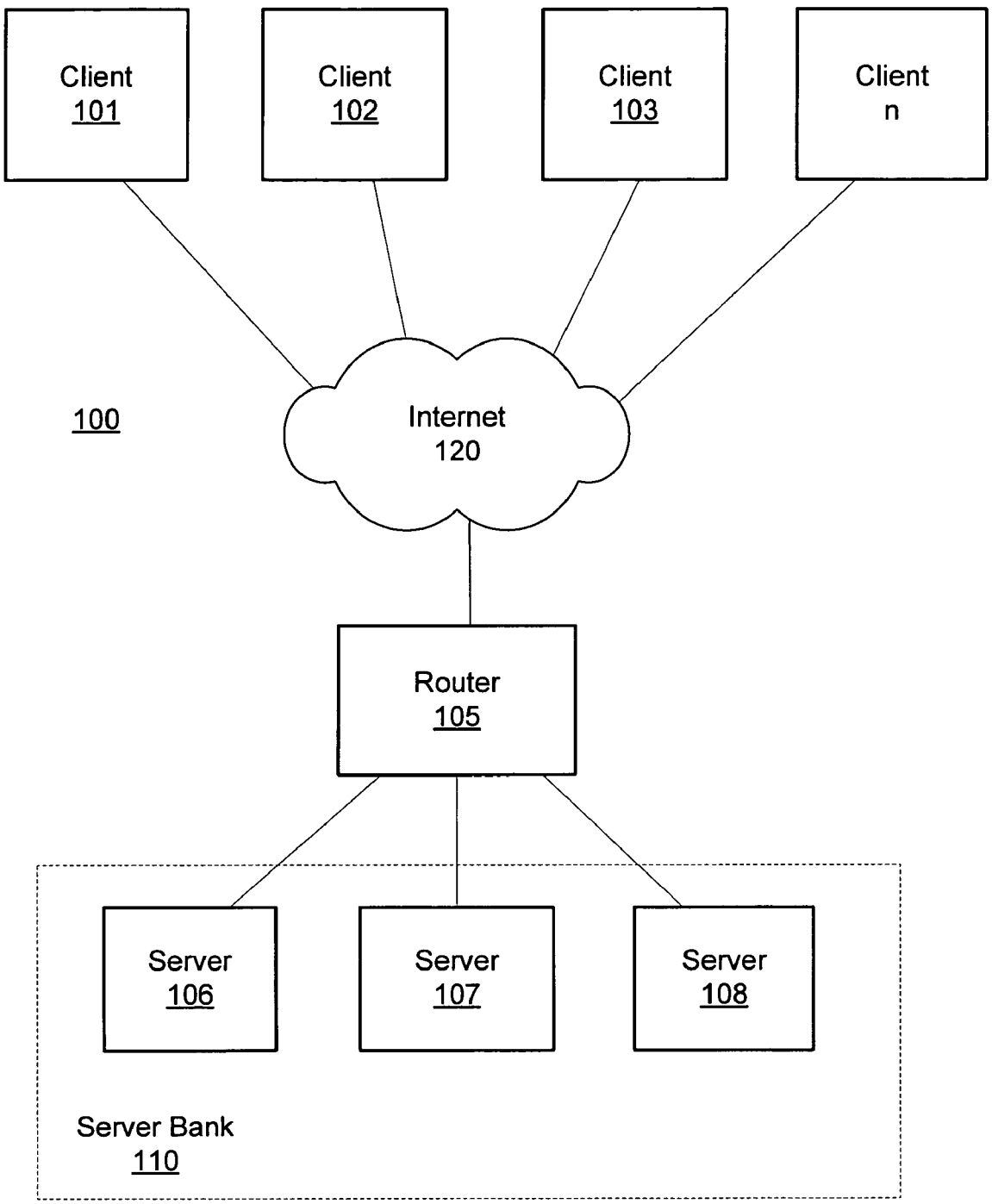
FIG. 1 provides a depiction of the environment in which the invention is used.

In FIG. 1, an example internetwork 120 in which an embodiment of the present invention may be utilized is illustrated. Data packets flow between clients 101-n and servers 106-n via router 105. Router 105 is between servers in the server bank 110 and internetwork 120. Although the embodiment described herein utilizes a router, other embodiments may utilize any device to control the flow of data packets between clients and servers. For e.g., switches, computing devices, wireless devices etc. The term client as used here is generic and is intended to mean any device, including but not limited to, a computing device, router, switch, and gateway that is the source of one or more communications with a server. So also the term server, as used here is generic and is intended to mean any device that communicates with a client, including a firewall SSL accelerator, primarily to provide data or programming content to the client. While the description that follows addresses the method as it applies to an internetwork (internet) architecture, it is appreciated by those of ordinary skill in the art that the method is generally applicable to any network architecture including, but not limited to, Local Area Networks (LANs), Metropolitan Area Networks (MANs), and Wide Area Networks (WANs).

In one embodiment, a web browser on a client accesses a HyperText Transfer Protocol (HTTP) based server hosting one or more websites on the World Wide Web (www). When a data packet transmitted from client 101 arrives at router 105, the source address and the destination address are obtained from the data packet. A hashing function is performed using the addresses as input, to obtain a hashed value.

In other embodiments, it may be possible to use HTTP or other "layer 5" or higher layer information in the packet header to obtain a unique key as input to the hashing function. In still other embodiments, parts of the TCP port numbers or parts of the IP addresses may be used as input to the hashing function.

In one embodiment, the hashed value obtained from the hashing function is divided by the number of entries in a server load sharing table as illustrated in FIG. 3. The server load sharing table contains either the IP address or the MAC address of the server or the switch port where the server is located. The router then uses the information in the server load sharing table to forward the data packet.

When subsequent data packets from the same client 101 arrive at router 105, a hashed value is obtained using the hashing function as described above. Using the hashed value as an index to the server load sharing table 300, the information of the server is obtained and the subsequent data packets are transmitted to the same server out the port number specified by the router's forwarding database. For the example shown in FIG. 3, the SLB algorithm in one embodiment of the invention searches, at most, n rows of the server address table, wherein n represents the number of servers in the server bank. The disclosed invention thereby eliminates the need for the SLB address table and eliminates lengthy and time consuming searches for a server's address.

Figure 4:
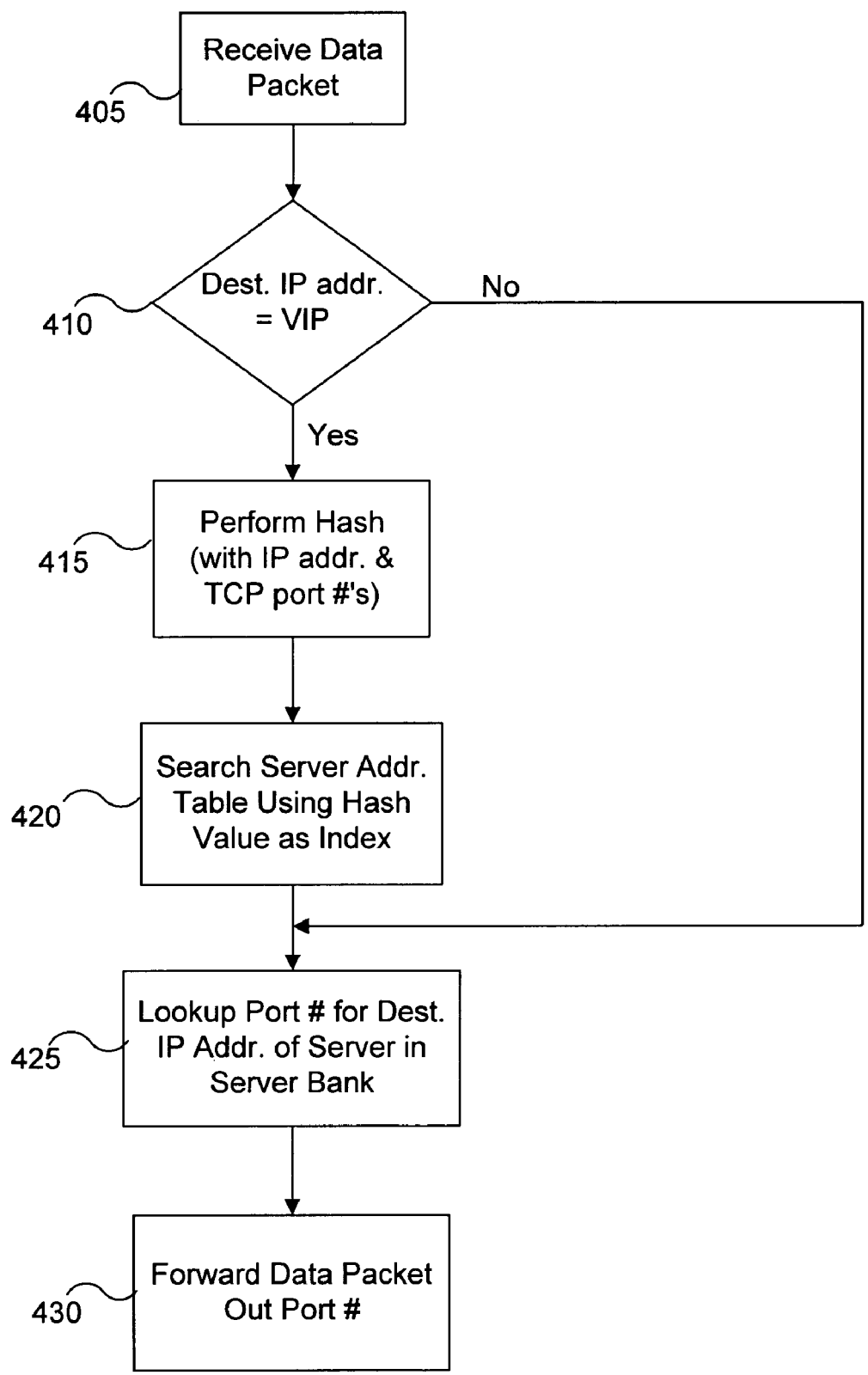
FIG. 4 is a flow diagram of an embodiment of the invention.

FIG. 4 illustrates a flow diagram of the process of receiving a data packet at router 105, and forwarding the data packet to a server in server bank 110. At 405, router 105 receives a data packet from a client. At 415, a hash is performed using the IP addresses and the TCP port number as described earlier. At 420, the router searches the server address table 300, using the hash value obtained as an index, for the IP address of a server in the server bank to which the data packet is to be forwarded. At 425, the router looks up the physical port out which to forward the data packet in the router's forwarding database, and at 430, the data packet is forwarded to the server in the server bank via the port number determined above. Subsequent data packets from the same client are forwarded to the same server by repeating the process described above.

Embodiments of the invention, including, but not limited to, tables utilized by the invention, may be represented as a software product stored on a machine-accessible medium (also referred to as a computer-accessible medium or a processor-accessible medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. For example, the procedures described herein for controlling the flow of data packets between clients and servers, can be stored on the machine-readable medium. Those of ordinary skill in the art will appreciate that other instructions and operations necessary to implement the described invention may also be stored on the machine-accessible medium.

What is claimed is:

1. A method for load balancing among a plurality of servers in a server bank comprising:
   receiving a data packet at a packet forwarding device to be forwarded to one of the plurality of servers in the server bank;
   performing a hash function using one or more identifiers for the data packet to generate a hash value;
   obtaining an address of one of the plurality of servers in the server bank from a server bank table by using the generated hash value as an index value for the address, wherein the server bank table includes an address of each server of the plurality of servers and an index value associated with each address; and
   forwarding the data packet to the server in the server bank using the address found in the server bank table.

2. The method of claim 1, wherein performing a hash function using one or more identifiers for the data packet comprises performing a hash function using the data packet's Internet Protocol (IP) source address.

3. The method of claim 1, wherein performing a hash function using one or more identifiers for the data packet comprises performing a hash function using the data packet's Internet Protocol (IP) destination address.

4. The method of claim 1, wherein performing a hash function using one or more identifiers for the data packet comprises performing a hash function using the data packet's Transmission Control Protocol (TCP) source port number.

5. The method of claim 1, wherein performing a hash function using one or more identifiers for the data packet comprises performing a hash function using the data packet's Transmission Control Protocol (TCP) destination port number.

6. The method of claim 1, wherein searching a server bank table for an address of one of the plurality of servers in the server bank comprises searching a server bank table for an Internet Protocol (IP) address of one of the plurality of servers in the server bank.

7. The method of claim 1, wherein searching a server bank table for an address of one of the plurality of servers in the server bank comprises searching a server bank table for a Media Access Control (MAC) address of one of the plurality of servers in the server bank.

8. An article of manufacture comprising:
a machine accessible medium including content that when accessed by a machine causes the machine to perform operations comprising:
receiving a data packet at a packet forwarding device to be forwarded to one of the plurality of servers in the server bank;
performing a hash function using one or more identifiers for the data packet to generate a hash value;
obtaining an address of one of the plurality of servers in the server bank from a server bank table by using the generated hash value as an index value for the address, wherein the server bank table includes an address of each server of the plurality of servers and an index value associated with each address; and
forwarding the data packet to the server in the server bank using the address found in the server bank table.

9. The article of manufacture of claim 8, wherein performing a hash function using one or more identifiers for the data packet to generate a hash value comprises performing a hash function using the data packet's Internet Protocol (IP) source address.

10. The article of manufacture of claim 8, wherein a machine performing a hash function using one or more identifiers for the data packet to generate a hash value comprises performing a hash function using the data packet's Internet Protocol (IP) destination address.

11. The article of manufacture of claim 8, wherein performing a hash function using one or more identifiers for the data packet to generate a hash value comprises performing a hash function using the data packet's Transmission Control Protocol (TCP) source port number.

12. The article of manufacture of claim 8, wherein performing a hash function using one or more identifiers for the data packet to generate a hash value comprises performing a hash function using the data packet's Transmission Control Protocol (TCP) destination port number.

13. The article of manufacture of claim 8, wherein searching a server bank table for an address of one of the plurality of servers in the server bank comprises searching a server bank table for an Internet Protocol (IP) address of one of the plurality of servers in the server bank.

14. The article of manufacture of claim 8, wherein a machine searching a server bank table for an address of one of the plurality of servers in the server bank comprises searching a server bank table for a Media Access Control (MAC) address of one of the plurality of servers in the server bank.

* * * * *